Dec. 10, 1963 W. D. PRICER 3,114,135

HIGH SPEED MEMORY

Filed June 13, 1961 2 Sheets-Sheet 1

INVENTOR
WILBUR D. PRICER

BY Joseph C. Redmond Jr.

ATTORNEY 3,114,135
Patented Dec. 10, 1963

3,114,135
HIGH SPEED MEMORY

Wilbur David Pricer, Wappingers Falls, N.Y., assignor to International Business Machines Corporation, New York, N.Y., a corporation of New York Filed June 13, 1961, Ser. No. 116,841
13 Claims. (Cl. 340—173)

This invention relates to high speed memories and more particularly to memories employing bistable semiconductor devices.

Computer performance is influenced to a large extent by memory operating speed. Considerable attention is given by industry, therefore, to increased memory speed, especially as memory capacity requirements ascend. Some of the memory qualities normally sought to be improved for increased memory speed are faster and more reliable coincidence operation, improved wave shape and faster driving devices. The latter quality, that is the driving devices, to a large extent controls the memory speed, and improvements in such as area have the most beneficial effect. High speed drivers, however, usually have the limitation of poor wave form for coincidence switching or insufficient power for memory operation. Memories which utilize the advantages of high speed drivers without the accompanying restrictions mentioned above would permit computers to be developed of unrestricted size without prejudice to their performance.

A general object of the present invention is an improved memory having low power requirements and high speed operation not requiring coincidence or wave form tolerances.

One object is a high speed memory having driver operation that approximates the switching speed of the memory circuits.

Another object is a non-destructive memory having improved output signals.

Another object is a memory employing signal bursts for word and bit selection.

Still another object is an improved memory which is substantially independent of the effects of noise.

A specific object is a memory employing bistable semiconductor devices and responsive to selection signals amenable to vast amounts of distortion.

Another specific object is a selection system for non-coincident memories.

These and other objects are accomplished in accordance with the present invention, one illustrative embodiment of which comprises a plurality of storage bits arranged in a matrix configuration, each bit comprising an impedance in combination with a bistable semi-conductor device. The impedance establishes an inactive or fatigue period for the cell by preventing redistribution of the current after switching of the bistable device. Each storage bit is suitably coupled to word and bit drivers which are high speed, low current devices. Selection of a word in the memory is accomplished by applying signal bursts to the bit and word lines in a number of different sequences. The signal burst need not be of any particular wave form or have any coincidence tolerance for selecting the word. One sequence for reading is to apply a signal pulse to a word line of interest. Thereafter, another pulse is applied to the same line. In so doing, the bistable devices are set and subsequently reset. To write a particular word, the same sequence is applied to the selected word line. Immediately after the second pulse, the bit lines to those bits of the word to be changed are pulsed. These bit pulses do not affect the selected word information condition since the bistable devices are inactive or fatigued. The bits do change the information condition of other words which are not of interest. At the end of the fatigue period second pulses are applied to the bit line which change the information state of all bistable devices connected to the line. Sensing apparatus detects the changes in the bit lines and determines from the changes the information stored in the word.

One feature of the invention is a memory cell consisting of a negative resistance device, a resistor and an inductor, the combination having some loose form of capacitive coupling wherein the negative resistance device is bistably operated such that a pulse applied to the circuit will switch the device from one stable state to the other and subsequent pulses occurring thereafter for a preselected interval will leave unaffected the state of the device due to the action of the inductance.

Another feature is a memory including a high speed, low current driver which supplies the optimum current requirement of the memory cells connected thereto while providing for reset thereof.

Another feature is a memory cell including a negative resistance device which is bistably biased and responsive to signals having substantially no restrictions with regard to wave form and noise effects.

Still another feature is a memory cell responsive to signal bursts from both word and bit drivers, the signal bursts being non-coincidently applied to the cell which provides positive and negative output signals therefrom depending upon the prior storage condition of the cell, and whereby no output signal from the cell is indicative of erroneous operation of the cell.

The foregoing and other objects, features and advantages of the invention will be apparent from the following more particular description of preferred embodiments of the invention as illustrated in the accompanying drawings.

Figure 3:
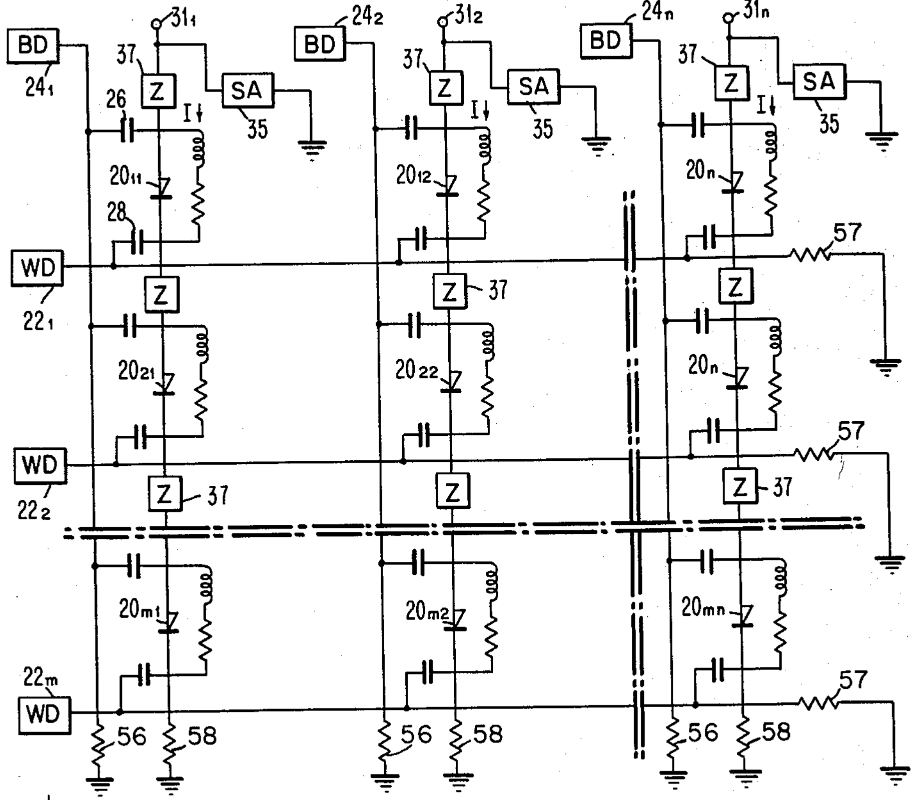
FIG. 3 is an electrical schematic of a memory employing a plurality of storage cells of the type shown in FIG. 1 and arranged for signal burst selection.

FIGS. 6A and B disclose another signal burst selection sequence with respect to time for the memory of FIG. 3 and;

FIGS. 7A, B, and C disclose still another signal burst selection sequence with respect to time for operating the memory of FIG. 3.

Figure 1:
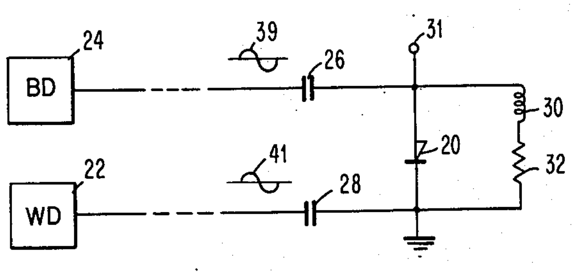
FIG. 1 is an electrical schematic of a storage cell employing the principles of the present invention.

Referring to FIG. 1, one embodiment of a storage cell employed in the memory of the present invention includes a bistable semiconductor element 20 connected to word and bit driver 22 and 24 through capacitors 26 and 28, respectively. The drivers for the bistable device 20 may be either high speed transistorized circuits or drivers which employ a bistable device, the same as that included in each memory circuit. The drivers will be described in more detail hereinafter. Also included in the memory cell is an impedance, typically an inductor 30 and a series resistor 32, the combination being connected in parallel with the bistable device 20. Completing the cell is a current supply I from a current source 31 for biasing purposes. Sensing of the cell is performed by a sense amplifier 35 (see FIG. 3) connected in the bias line to the cell.

Figure 2:
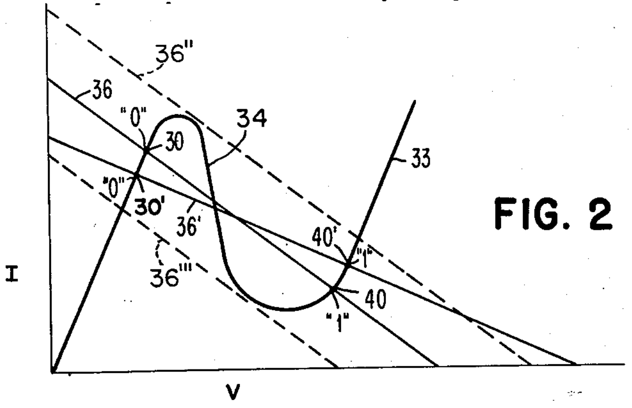
FIG. 2 is a current-voltage characteristic of a negative resistance device.

Bistable devices are known to exist in several forms to workers skilled in the art. One eminently satisfactory bistable device is described in an article entitled "New Phenomena in Narrow Germanium P–N Junction," Physical Review, vol. 109, 1958, pages 603–604 by Leo Esaki. The device described in the previously mentioned publications is commonly referred to as a tunnel diode or Esaki diode. The tunnel diode has a characteristic curve 33 which includes a negative resistance characteristic 34 as shown in FIG. 2. When the diode is suitably loaded and biased, a load line 36 is developed which establishes information states for a binary "0" and a binary "1" indicated at points 38 and 40, respectively. A diode may be switched from the "0" state to the "1" state by a positive pulse which raises the load line 36 to a position 36'' above the peak of the curve 33. Similarly, the diode may be switched from the "1" state to the "0" state by the application of a negative pulse which lowers the load line 36 to a position 36''' below the valley of the curve. Details of the tunnel diode as a binary storage device appear throughout the technical literature, for example, see the "Digest of Technical Papers," 1960 International Solid State Circuits Conference, Louis Winner, New York 36, N.Y., publisher.

The tunnel diode has been selected as a preferred bistable semiconductor element for the present invention because of the extreme speed of response thereof. Accordingly, the remaining paragraphs of the detailed description will be limited to memory circuits employing the characteristics of the tunnel diode, but it should be understood that other bistable semiconductors may be employed in the present invention with satisfactory results.

Operation of the memory cell of FIG. 1 will now be described in order to demonstrate a unique feature thereof which aids in the novel performance of the memory of the present invention.

Normally, the diode 20 is at stable operating point 38 (see FIG. 2) which is indicative of a binary "0" storage condition. A pulsing signal including positive and negative portions, typically a sinusoidal wave is applied to either the bit line or word line 22, the magnitude of the pulse being sufficient to switch the diode to the binary "1" or "0" state on the positive and negative half-cycles thereof, respectively. In the case of a pulse signal 39 (see FIG. 1) applied to the bit line 24, the positive half cycle thereof switches the diode from the binary "0" to the binary "1" state for reasons previously indicated. The negative cycle, however, does not return the diode to the "0" state due to the inductor 30 which prevents the redistribution of current in the cell. Stated another way, switching of the diode to the binary "1" state increases the voltage of the cell which reduces the bias current to the cell. The change in bias current is opposed by the inductor which supplies its stored energy thereof and opposes the efforts of the negative cycle to return the cell to the "0" condition. Since the change in bias current is larger than that of the negative cycle, the latter has no effect on the new storage condition of the cell.

A pulse applied to the bit line while the cell is in the "1" storage condition has a similar effect to that described for the "0" storage condition. The positive cycle shuttles the operating point up the curve 33 and the negative cycle pulls the operating point toward and beyond the valley of the curve. Again the inductor opposes the redistribution of current and delays the arrival of diode at the operating point 38 due to the time constant of the inductor. In designing the cell, the inductor time constant is selected to prevent two simultaneous bursts from operating the cell. This may also be thought of as being overdamped for signal inputs. Consequently, the cell responds to each signal by switching once and only once. If two signals arrive in near coincidence or in rapid succession, the memory cell will respond as if there were only one signal. During the period that the memory cell is inoperative, the diode is said to be "fatigued" and cannot respond to further excitation except by shuttling along the operating curve away from the valley in the case of a binary "1" storage condition. Operation of the cell with a pulse 41 applied to the word line is the same as that described for the bit line 24. For reasons of brevity, such description of the circuit will be omitted.

Turning now to FIG. 3, the memory of the present invention includes a plurality of the storage cells of the type shown in FIG. 1 arranged in a matrix configuration. Word and bit drivers $22_1 \ldots 22_m$ and $24_1 \ldots 24_n$, respectively, are connected to each cell. Each cell has a different set of word and bit drivers connected thereto. The cells are biased from current sources $31_1 \ldots 31_n$. Cells having the same bit drivers are also connected to the same current source. Sense amplifiers 35 of conventional design are suitably connected to each bias line to detect voltage changes across the series connected diodes, said voltage changes providing very distinguishable signals indicative of the storage condition of the diodes. Also included in each bias line and associated with a storage cell is an impedance 37 which isolates the word drivers from each other. Completing the matrix are the necessary terminating resistors 56, 57 and 58 in the bit, word and bias lines, respectively, said resistors being suitably connected to a source of reference potential, typically ground.

Before describing the operation of the memory, the drivers will be described since they contribute to the high memory speed by not constraining the memory circuits to a switching speed less than their inherent speed.

Figure 4:
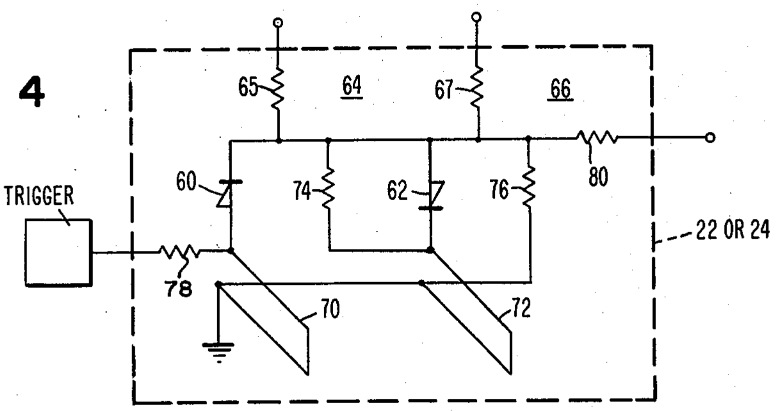
FIG. 4 is an electrical schematic of a signal selection driver employed with the memory of FIG. 3.

A driver that does not restrict the memory speed of the present invention is shown in FIG. 4. Tunnel diodes 60 and 62 included in the driver provide a switching speed therefor which is substantially the same as that of the memory. A two stage driver circuit, shown in FIG. 4, is typical of many that may be employed with the memory. It should be noted, however, that the driver may contain any number of stages. A two stage driver was selected solely for reasons of convenience in explanation. The fact that each memory circuit has low power requirement and will not require any particular wave form or coincidence for switching purposes, as will be described hereinafter, enables a wide variety of tunnel diode pulse circuits to be employed in the invention.

The driver of FIG. 4 is particularly suitable for use with the memory since it delivers the optimum switching current while simultaneously providing for independent reset thereof.

The tunnel diodes 60 and 62 included in the driver of FIG. 4 are connected to individual current supplies 64 and 66, respectively. The current supply 64 which includes resistor 65 is connected to the cathode of the diode 60 whereas the supply 66 which includes resistor 67 is connected to the anode of the diode 62. Each diode has associated therewith a transmission or delay line 70 and 72, the former being between ground and the anode circuit of the diode 60 whereas the latter is between ground and the cathode circuit of the diode 62. The diodes are also interconnected through resistor 74 which couples the cathodes of the diodes together and resistor 76 which couples the latter anode to ground. Input signals are supplied by a trigger through resistor 78 to the anode of diode 60 and output signals are coupled through resistor 80 to the memory.

Figure 4A:
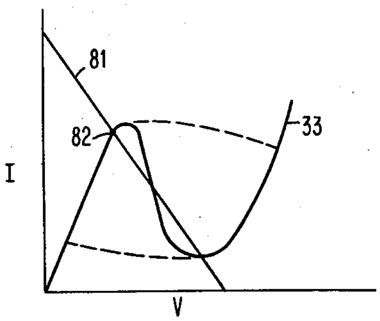
FIG. 4A is a current-voltage curve of a negative resistance device indicating the bias condition thereof when employed in the circuit of FIG. 4.
Figure 4B:
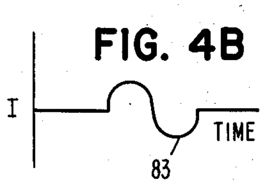
FIG. 4B is a current-time curve for an output pulse from the circuit of FIG. 4.

Each diode of the driver is biased along respective load lines 81 for monostable operation at point 82 (see FIG. 4A). For monostable operation an input pulse raises the load line above the peak of the curve 33 causing the diode to switch to the high voltage condition, the diode returning independently to the point 82 after removal of the input pulse. When the diode 60 is switched a pulse appears on the transmission line 70 due to the absence of current, the pulse being reflected back to aid in resetting the diode by driving the operation point thereof beyond the valley of the curve 33 to the operating point 82. Simultaneously with switching, current from the source 64 is applied to the diode 72 which is caused to switch and apply a pulse 83 shown in FIG. 4B on the output line. Each pulse includes a positive and negative cycle as required by the memory. Upon switching of the diode 62, a pulse also appears on the transmission line 72 which resets the diode 62 for the reasons indicated for the diode 60.

It will be noted that the driver switches the constant current bias for a prescribed interval due to the cooperation between the tunnel diodes and their transmission line. Thus, an optimum amount of current can be transferred to the memory for switching purposes. Also, the pulse width is readily controlled by suitable design of the transmission line. Further, the independent reset of each stage permits another trigger pulse to be supplied to the driver before the last stage has reset.

Figure 5:
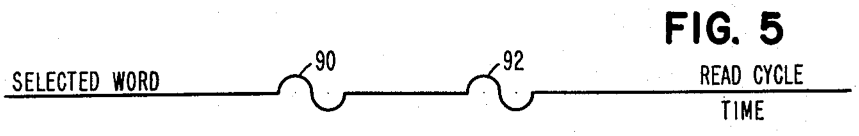
FIG. 5 is a signal burst selection sequence with respect to time for operating the memory of FIG. 3.
Figure 6:
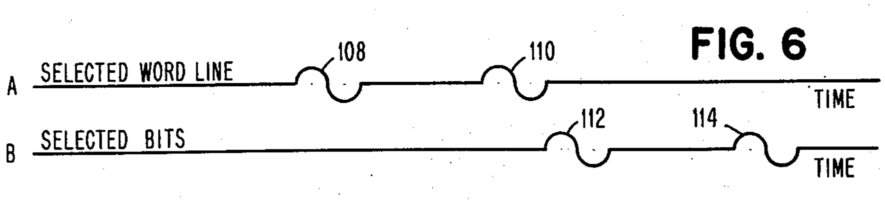
Figure 7:
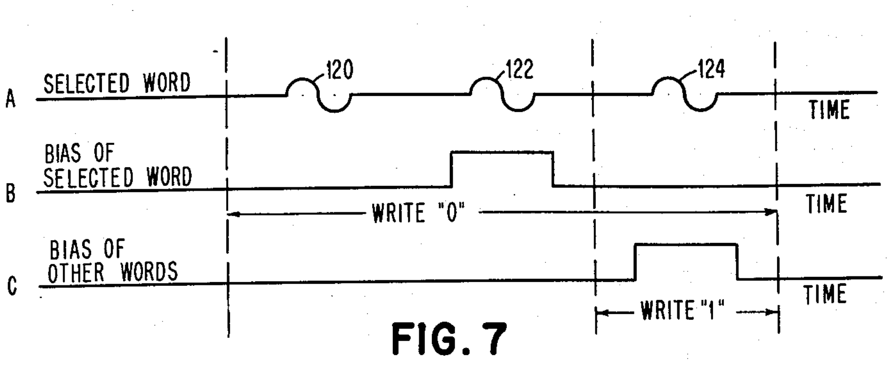

Returning now to FIG.3, the operation of the memory will be described in conjunction with FIGS. 5, 6 and 7 which show various pulse sequences for operating the memory.

One mode of operating of the memory is a single dimension read only selection sequence. This sequence, shown in FIG. 5, is the simplest of several proposed. To read a particular word, the word driver 22 thereof supplies pulse 90 which causes the diodes of interest to change stable states. Since as previously indicated, a diode will switch in either binary storage condition the sense amplifier will witness positive and negative changes on the bias line. Failure to record a change on bias line will be an indication of a defective memory circuit. Thereafter, the word can be reset to the initial storage state by the driver supplying pulse 92 to the line. Thus, the present operating sequence permits destructive and non-destructive read-out of the memory according to the number of pulses supplied to a word line. The non-destructive output signal is not a small variation about one of the diode operating voltages as in the case of prior art circuits, but rather the difference between the two operating voltages of the diode. Thus, the present invention provides improved output signals from non-destructive memories. For non-destructive read-out it is believed apparent, however, that the second pulse should occur after the "fatigue" period of the word cells, otherwise the second pulse would have no effect on the information status of the pulse.

In another sequence which is shown in FIGS. 6A and B, the selected word line receives pulse 108 and provides a read-out signal of the stored information state. Thereafter, pulse 110 is applied again to the selected word lines, the pulse resetting the cell to the starting information state. Thus, pulses 108 and 110 provide non-destructive read-out of the word of interest. While the pulse 110 is occurring or immediately thereafter, pulse 112 is applied to the bit lines of those to be changed in the selected word of interest. These pulses do not affect the storage condition of the selected word due to the "fatigue" condition of the cells. The pulses, however, do change the information state of the other bits on the line that are not in the word of interest. A subsequent pulse 114 applied to these same bit lines will set a new information state into the diodes of the selected word line. The other bits on the line not in the word of interest will be reset to their starting information state. Thus, all cells in the memory intersected by only one active bit line or one active word line are complemented twice and are thus returned to their original state. However, memory cells at the intersection of two such active lines are complemented three times and thus are permanently altered.

In neither the read nor write cycle does the memory require signal coincidence or a particular wave shape for operation. Operation is solely dependent on the pulse magnitude and the switching speed of the drivers which approaches that of the memory circuits. Further, power requirements of the memory are also relatively low due to the characteristics of the tunnel diodes. No problems are presented in designing the drivers to provide the necessary power requirements for memory operation.

With regard to memory speed, matching the driver speed to that of the tunnel diode memory circuits by the use of drivers having tunnel diodes removes one of the principal factors affecting memory speed. Heretofore, tunnel diode memory speeds were constrained to an operating speed less than that inherently possible due to the characteristics of the drivers which employed devices having slower switching speeds than that of the memory circuit. Now memory circuits can operate as fast as inherently possible due to the matching of the driver and memory circuit devices. The inherent switching speed of a tunnel diode, as indicated in the Esaki article previously mentioned, is practically immeasurable. Thus, the combination of tunnel diode drivers and memory circuits provides a memory that from a practical standpoint is unrestricted with respect to operating speed.

Still another sequence for operating the memory is to modify the D.C. load line of each cell so that it is not as steep as that indicated in FIG. 2. A suggested load line 36′ renders the sensitivity of the high voltage storage condition of each cell controllable. Increasing the bias of a cell elevates the load line and renders the binary "1" insensitive to signal burst whereas the binary "0" remains sensitive to signal burst. This effect enables the storage cells to be selected by coincidence in addition to providing the non-destructive aspect previously indicated.

A typical sequence for this mode of operation is indicated in FIG. 7A wherein pulse 120 is applied by the word driver to switch the cells and provide a read-out signal. Pulse 122 is applied to the cells for write purposes in conjunction with an increase in bias to those bits which are to be switched to zero. Those bits receiving both the bias and word signals are placed in the "1" condition whereas all other bits are complemented. To write a "0" in a cell, the coincident bias and word signals are applied to the cell or cells of interest and thereafter the cell is complemented by a word signal 124. Thus, this mode provides coincident operation in addition to providing the non-destructive operating feature previously described.

The memory circuit shown in FIG. 1 is only one of many possibilities that may be employed in the present invention. Another possibility is to employ a tunnel diode memory circuit wherein the word and bit signal bursts are transformer coupled to the memory cell instead of capacitor coupled as in the present embodiment. A memory circuit employing transformer coupling is disclosed in a copending application of the present inventor, Serial 104,274, filed April 20, 1961, and assigned to the same assignee as the present invention. Such a memory eliminates the requirement of an inductor, capacitor and the isolation impedance in each cell since the transformer performs these functions as well as the coupling function.

Noise or distortion appearing in the memory or driving circuits have little or no effect on the operation thereof. Changing the information content of a word, for the most part, depends upon the amplitude of the driving pulses for switching the tunnel diodes, instead of the coincidence of two pulses as in the conventional memory. Consequently, the addition of noise or distortion to the pulses generated by the drivers of the present invention will not affect the switching operation of the matrix, whereas in conventional coincident current memories the additional noise or distortion may be sufficient to cause a malfunction. Also, operation of the memory is independent of the wave shape generated by the drivers. Operation, as previously indicated, is dependent upon the amplitude of the driving pulses and this characteristic may be readily controlled in the design of the driving circuits. Additionally, no complicated read-out circuits are required for the present invention. Conventional sense amplifiers can be connected to bias lines and detect distinguishable voltage indication of the status of the memory when switching thereof occurs. Thus, the present invention has provided an improved memory having a novel operation which provides high speed in reading and writing due to the characteristics of the tunnel diode and the use of an inductor to prevent a diode from responding to more than one signal of successive signals. The simplicity of the circuitry and the expectant low cost of the tunnel diode render the memory suitable for use in computers required to handle large quantities of data at rapid speeds.

While the invention has been particularly shown and described with reference to preferred embodiments thereof, it will be understood by those skilled in the art that various changes in form and detail may be made therein without departing from the spirit and scope of the invention.

What is claimed is:

1. A memory circuit comprising a bistable semiconductor device biased for bistable operation, at least one signal source, means coupling said circuit to the signal source, each signal source being adapted to provide an output signal having positive and negative cycles, each signal being suitable to switch the bistable device from one stable state to the other regardless of the stable state, and impedance means coupled across said bistable device for rendering the device responsive to one and only one of two successive input signals.

2. A memory circuit comprising a bistable semiconductor device biased for bistable operation, a first signal burst generator and a second signal burst generator, both signal burst generators being adapted to provide sinusoidally like output signals which switch the bistable device from one stable state to the other, means coupling said signal burst generators to said bistable device and impedance means having a predetermined time constant coupled to said bistable device and adapted to prevent the bistable device from changing information states in response to successive signals applied by one or both signal burst generators.

3. A memory circuit comprising a bistable semiconductor device biased for bistable operation, a first signal burst generator connected to one side of the bistable device, a second signal burst generator connected to the other side of the bistable device, both signal burst generators being adapted to provide output signals having positive and negative cycles which switch the bistable device from one stable state to the other, capacitive means coupling said generators to said bistable device and an impedance for rendering the bistable device inactive to signal generators having a predetermined interval, said impedance being connected in parallel with said bistable device and having a time constant greater than the predetermined interval between the signal generator signals.

4. The memory circuit defined in claim 3 wherein the impedance means is an inductor and serves to couple the signal burst generators to the bistable device in lieu of the capacitors.

5. The memory circuit defined in claim 4 wherein the bistable device is a tunnel diode.

6. A memory comprising a plurality of storage cells arranged in a matrix configuration, each storage cell comprising a bistable semiconductor device and an impedance connected in an over-damped circuit arrangement, a plurality of word and bit drivers, each cell being connected to a different combination of word and bit drivers than the other cells, said drivers being individually adapted to provide a sinusoidally like signal to said cells for switching purposes, means for biasing each cell into a bistable operating condition, and sense means adapted to record the voltage changes appearing across those cells connected to the same bit driver.

7. A memory comprising a plurality of storage cells arranged in a matrix configuration, each cell including a bistable semiconductor device and an impedance for controlling the switching operation of the bistable device, each cell being adapted to provide an output signal when changed from one stable condition to the other, each cell having an inactive period after switching, as a result of the impedance, a plurality of sets of signal burst drivers, each cell being coupled through impedance means to a different set of signal burst drivers, means for biasing the cells into operation and sense means for indicating defective cells and recording the output signals from the cells when a change of state thereof occurs whereby successive signal bursts supplied to a cell from a set of drivers will cause non-destructive read-out of the stable state of the cell provided the successive signal burst period exceeds the inactive period of the cell.

8. A memory comprising a plurality of storage cells arranged in a matrix configuration, sets of signal burst generator means connected to the storage cells, each set including a word driver and a bit driver, a different set of drivers connected to each cell, each storage cell including a bistable semiconductor device and an impedance in parallel relation, said impedance being adapted to control the switching operation of the bistable device, means for serially biasing those bistable devices connected to the same bit driver and sense means connected to each bias lines whereby successive signal burst from a word driver will set and reset the bistable devices connected to the word driver thereby providing an output on the bias lines indicative of the stable states of the devices and a single pulse from a word driver will alter the stable state of the bistable devices connected thereto to record therein a new information state.

9. A memory circuit comprising a plurality of storage cells arranged in a matrix configuration, each cell including a switching device having a negative resistance device and an impedance arranged in an over-damped circuit whereby the switching speed of the switching device is controlled, each cell having an inactive period after switching signal burst generator means for providing output signals to said switching devices which have two distinct stable operating conditions, said signal burst generator means adapted to provide the optimum current for switching the devices connected thereto and including means for controlling precisely the pulse rate of said generator, means for biasing the switching devices for bistable operation and sense means for recording the stable condition of the switching devices.

10. A memory circuit comprising a plurality of storage cells arranged in a matrix configuration, each storage cell including a negative resistance device and impedance means, each negative resistance device being adapted to have two stable operating conditions, said negative resistance devices being responsive to signal burst generator means to change stable operating conditions, each signal generator means being adapted to provide the optimum current for switching of said devices and thereafter to independently reset itself, means for coupling sets of said signal burst generator means to each storage cell, different sets of signal burst generator means being transformer connected to each storage cell, said transformer including means for preventing the storage cells from changing stable operating conditions for a preselected period after switching between stable operating conditions and means for recording the storage conditions of the cells.

11. In a memory a plurality of storage cells arranged in a matrix configuration, each cell including a negative resistance device, an impedance means, each negative resistance device being adapted to have two stable operating conditions and signal burst generator means for changing the stable operating conditions of the storage cells, each signal burst generator comprising a negative resistance device having a stable and unstable operating condition, input and output circuit means connected to opposite sides of the device, delay means connected to each device and means for biasing the device to a single stable operating condition whereby a trigger pulse applied to the input circuit will switch the device from the stable operating condition to an unstable operating condition and provide a signal on the transmission line, the switching of the device from the stable to the unstable operating condition providing a signal on the output circuit and the pulse on the transmission line being reflected toward the device to aid in resetting the device to the stable operating condition.

12. The memory as defined in claim 11 wherein the signal burst generator comprises two or more negative resistance devices connected in series aiding relation, each negative resistance device having a stable and an unstable operating condition and being biased from a current source for normal operation in the stable state, delay means connected to each negative resistance device, and input and output circuit means connected to the devices whereby a signal applied to the input circuit switches the negative resistance devices in succession from their stable operating condition to the unstable condition to provide a signal to the output circuit and simultaneously develop a pulse on each transmission line prior to switching of the device associated therewith, said transmission line pulses providing independent reset of each negative resistance device.

13. A memory circuit comprising a tunnel diode device having first and second terminals, means for biasing the tunnel diode device for bistable operation connected at the first terminal, means coupling a first bipolar signal to the first terminal, means coupling a second bipolar signal to the second terminal, and means including energy storage means connected between the first and second terminals to render the tunnel diode fatigued for a preselected period after switching of the tunnel diode.

References Cited in the file of this patent

UNITED STATES PATENTS

| | | |
|---|---|---|
| 2,884,618 | Epstein | Apr. 28, 1959 |
| 2,907,000 | Lawrence | Sept. 29, 1959 |
| 2,957,164 | Long | Oct. 18, 1960 |
| 3,017,613 | Miller | Jan. 16, 1962 |